United States Patent [19]

Makuch et al.

[11] 4,140,366
[45] Feb. 20, 1979

[54] FIBER OPTIC CONNECTOR ASSEMBLY

[75] Inventors: John A. Makuch, Danbury; Henry R. Fredlund, Jr., Bridgewater, both of Conn.

[73] Assignee: Bunker Ramo Corporation, Oak Brook, Ill.

[21] Appl. No.: 788,820

[22] Filed: Apr. 19, 1977

[51] Int. Cl.² ............................................. G02B 5/16
[52] U.S. Cl. ............................ 350/96.22; 350/96.21
[58] Field of Search ............... 350/96 C, 96.21, 96.22

[56] References Cited
U.S. PATENT DOCUMENTS

| 3,904,269 | 9/1975 | Lebduska et al. | 350/96 C |
| 3,910,678 | 10/1975 | McCartney et al. | 350/96 C |
| 3,914,015 | 10/1975 | McCartney | 350/96 C |
| 3,923,371 | 12/1975 | Dalgleish | 350/96 C |
| 3,984,174 | 10/1976 | Landgreen | 350/96 C |
| 4,027,938 | 6/1977 | Lewis | 350/96 C |

Primary Examiner—John K. Corbin
Assistant Examiner—Stewart Levy
Attorney, Agent, or Firm—William Lohff; F. M. Arbuckle

[57] ABSTRACT

An assembly for use in a fiber optic connector for aligning and spacing the terminal ends of a pair of fiber optic cables to achieve efficient light transfer includes a pair of terminal pins, each having a bore for receiving one of the cables and an external shoulder. A resilient sleeve is tightly received over the terminal pins to align the terminal ends in facing relation and abuts the terminal pin shoulders to effect a predetermined close spacing of the terminal ends to provide efficient light transfer between the pair of fiber optic cables.

In a preferred form, each terminal pin includes an insert member which has a concentric channel for receiving and aligning one of the fiber optic cables concentric with the outer dimension of the terminal pin.

9 Claims, 13 Drawing Figures

FIBER OPTIC CONNECTOR ASSEMBLY

RELATED APPLICATIONS

This application is related as to subject matter to copending application Ser. No. 788,985, filed Apr. 19, 1977, of John A. Makuch and Melvin Gordon for MULTIPLE CHANNEL CONNECTOR FOR FIBER OPTIC CABLES, which is a continuation-in-part of application Ser. No. 731,036, filed Oct. 8, 1976, now abandoned, of John A. Makuch and Melvin Gordon for CONNECTOR FOR FIBER OPTIC TUBING.

BACKGROUND OF THE INVENTION

The invention is directed generally to connectors, and more particularly to an assembly for use in a fiber optic connector which aligns and spaces the terminal ends of a pair of fiber optic cables to provide efficient light transfer between the cables.

In recent years fiber optic light transmission systems, wherein a single optically-conductive fiber or a multiplicity of parallel optically-conductive fibers are arranged to form a flexible light-conductive cable bundle for conveying light from one location to another, have come into increasing use, not only for providing illumination, but also for conveying data from one location to another. In the latter application a light source is modulated with data to be transmitted at one end of the cable bundle, and the data is recovered at the other end of the cable bundle by a photo-sensitive detector. Since the data is conveyed by a medium not subject to radio frequency interference or detection, such light transmission systems are particularly well adapted for high security applications, such as found in the data processing and military communications fields.

With the increasing use of fiber optic systems, the need has developed for a connector for connecting segments of light-conductive cable bundles with minimum detriment to the optical transmission path. Prior art connectors for this purpose have not been completely satisfactory, particularly where frequent connects and disconnects must be made under adverse environmental conditions, or where multiple fiber optic circuits must be connected in a single connector because of the difficulty of maintaining an accurate consistent alignment between the ends of coupled cable segments under such conditions.

It is generally well known that the tolerances are very strict in the interconnection of a pair of fiber optic cables. The terminal ends of the cables must be axially and angularly aligned and as close together as possible without touching to achieve efficient light transfer. The glass material which is commonly used as the light conducting fiber core of the cables is very brittle, and touching of the cable terminal end faces results in abrasions to the end faces which results in consequent reduced light transfer efficiency. The present invention is directed to an assembly for use in a fiber optic connector which aligns and spaces the terminal ends of a pair of fiber optic cables to achieve efficient light transfer.

Accordingly, it is a general object of the present invention to provide a new and improved connector for light-conductive cable bundle segments.

It is another object of the present invention to provide an assembly for use in a fiber optic connector which provides efficient light transfer between a pair of fiber optic cables.

It is another object of the present invention to provide a new and improved fiber optic connector assembly which aligns and spaces the terminal ends of a pair of fiber optic cables to effect efficient light transfer between the cables.

SUMMARY OF THE INVENTION

The invention provides an assembly for aligning and spacing the terminal ends of a pair of fiber optic cables to achieve efficient light transfer between the cables. The assembly includes a first terminal pin having a bore for receiving the terminal end of one of the cables and having an external shoulder portion, a second terminal pin having a bore for receiving the terminal end of the other cable and having an external shoulder portion, and resilient sleeve means tightly received over the first and second terminal pins for aligning the terminal ends in facing relation and for communicating with the external shoulders to effect a predetermined close spacing of the terminal ends to provide an efficient light transfer between the pair of fiber optic cables.

The invention also provides a terminal pin assembly for use in a connector of the type which aligns the terminal end faces of a pair of fiber optic cables. The terminal pin assembly includes a tubular housing having a rear portion and a forward portion, a longitudinal bore dimensioned for receiving the terminal end of a fiber optic cable, and a counter-bore in the forward portion concentric with the outer dimension of the tubular housing and being greater in dimension than the longitudinal bore, and tubular insert means dimensioned for being received in the counter-bore and having a concentric channel communicating with the longitudinal bore for receiving the fiber optic cable and for aligning the cable substantially concentric to the outer dimension of the tubular housing.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
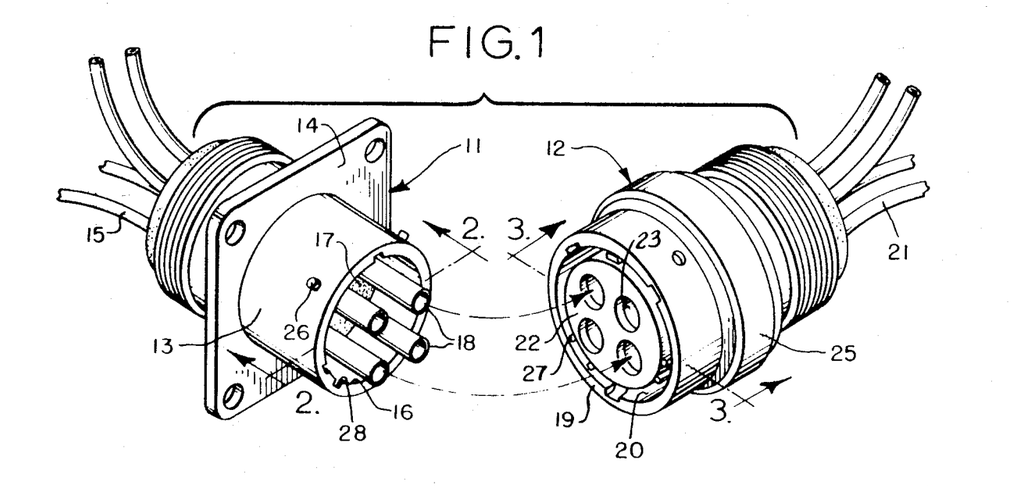
FIG. 1 is a perspective view of a connector which may incorporate the assembly of the present invention.
Figure 2:
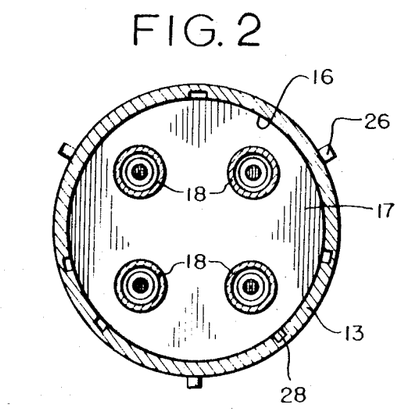
FIG. 2 is a cross-sectional view of the receptacle portion of the connector taken along line 2—2 of FIG. 1.
Figure 3:
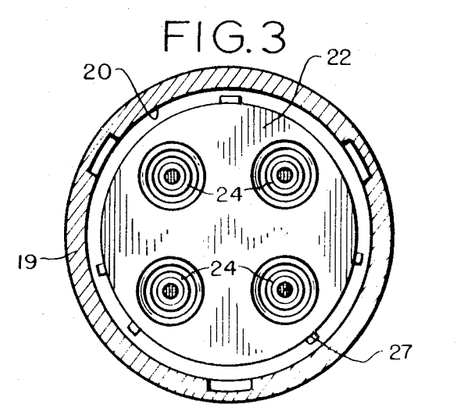
FIG. 3 is a cross-sectional view of the plug portion of the connector taken along line 3—3 of FIG. 1.

Referring to the figures, and particularly to FIGS. 1-3, a connector 10 which may incorporate the present invention includes a flange-mounted receptacle 11, and a cable-mounted plug 12. Receptacle 11 could also of course be bulkhead mounted or cable mounted as well without departing from the invention. The receptalce includes a generally sleeve-shaped metal shell 13 having a front or mating end for receiving plug 12, and a flange 14 rearwardly of the mating end for mounting the receptacle to a wall or bulkhead (not shown). Individual segments of light-conductive cable 15 for which interconnections are to be established by the connector enter the receptacle from the rear. A plug-receiving recess 16 extends rearwardly from the forward end of the receptacle. An insert assembly 17 positioned within shell 13 supports the projecting ends of four female fiber optic alignment sleeves 18 forming connecting assemblies associated with respective ones of light-conductive cable segments 15.

Plug 12 includes a generally sleeve-shaped elongated cylindrical shell having a front or mating end, and a recess 20 extending rearwardly from the front end of the plug for receiving in telescoping relationship the forward end of the receptacle shell 13. Fiber optic cable segments 21 to which interconnections are to be provided extend into the rear of the connector. A generally cylindrical insert assembly 22 dimensioned for telescoping insertion into recess 16 is disposed within recess 20, and includes four axially-extending apertures 23 in which four male fiber optic connecting assemblies 24 (FIG. 3) are positioned. A locking ring 25 of conventional construction is concentrically disposed over shell 19 to provide twist-lock engagement with protuberances 26 on shell 13 when the plug and receptacle are mated, in a manner well known to the art. A plurality of locating keys 27 on the sidewall of insert assembly 22 coact with keyways 28 provided on the inside wall of recess 16 to assure correct orientation between the two insert assemblies.

Figures 4, 6, 7:
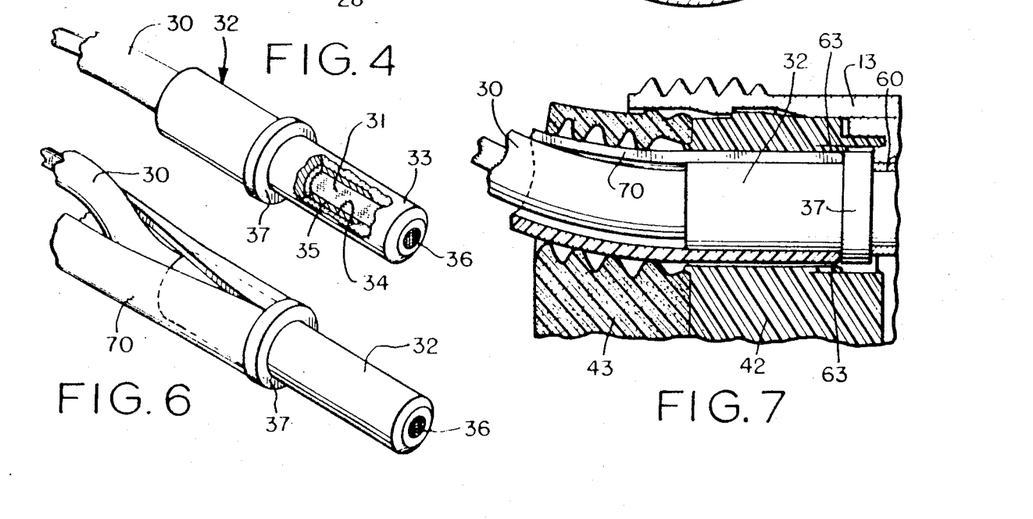
FIG. 4 is a perspective view, partially broken away, of a fiber optic termination pin utilized in the connector for terminating the ends of light-conductive cable bundle segments.
FIG. 6 is a perspective view of the termination pin of FIG. 4 shown in conjunction with a pin removal tool.
FIG. 7 is an enlarged cross-sectional view of a portion of the connector illustrating the use of the pin removal tool for removing a termination pin from the connector.
Figure 5A:
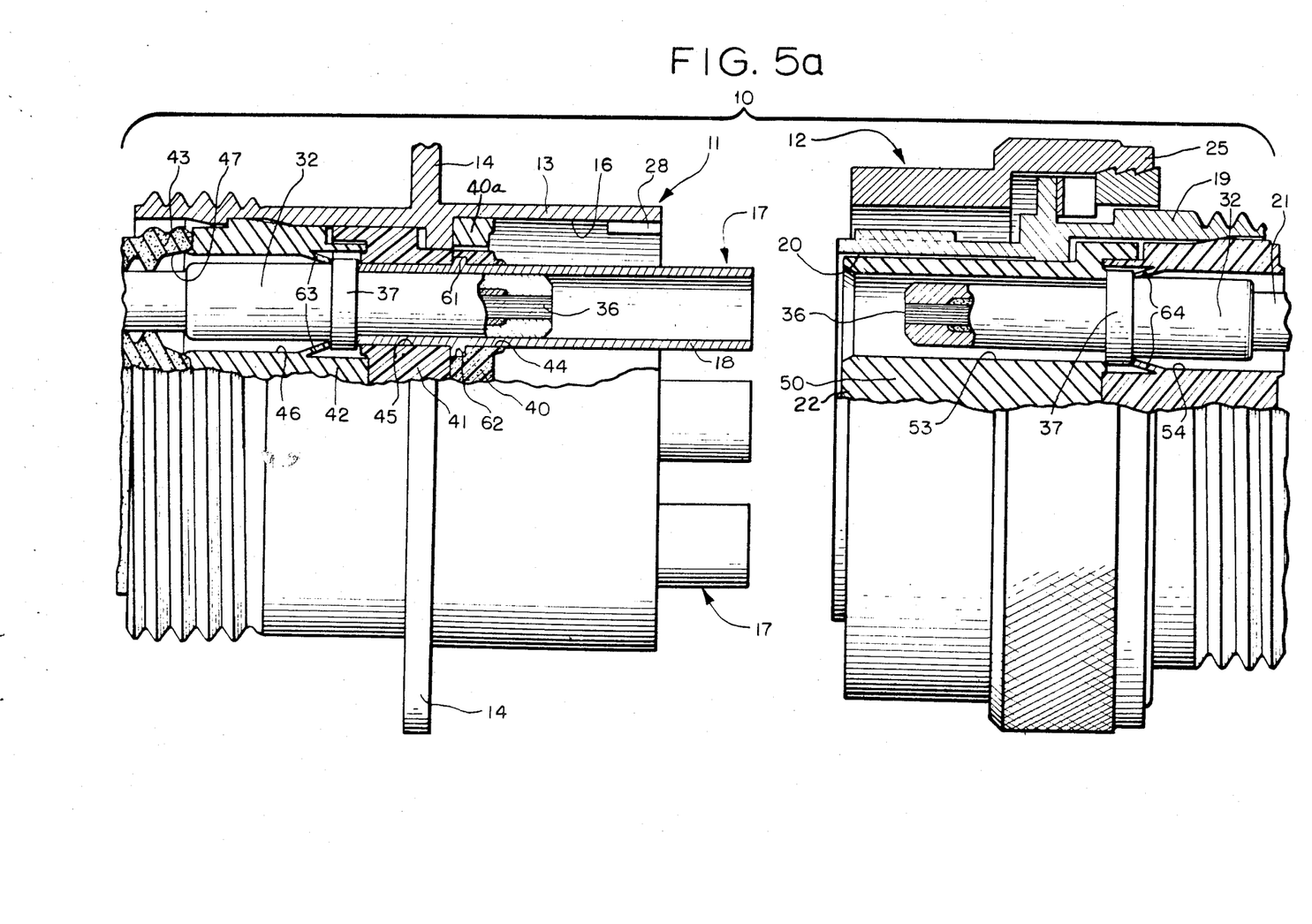
FIG. 5a is an enlarged side elevational view, partially in cross-section, of the connector in an unmated condition.
Figure 5B:
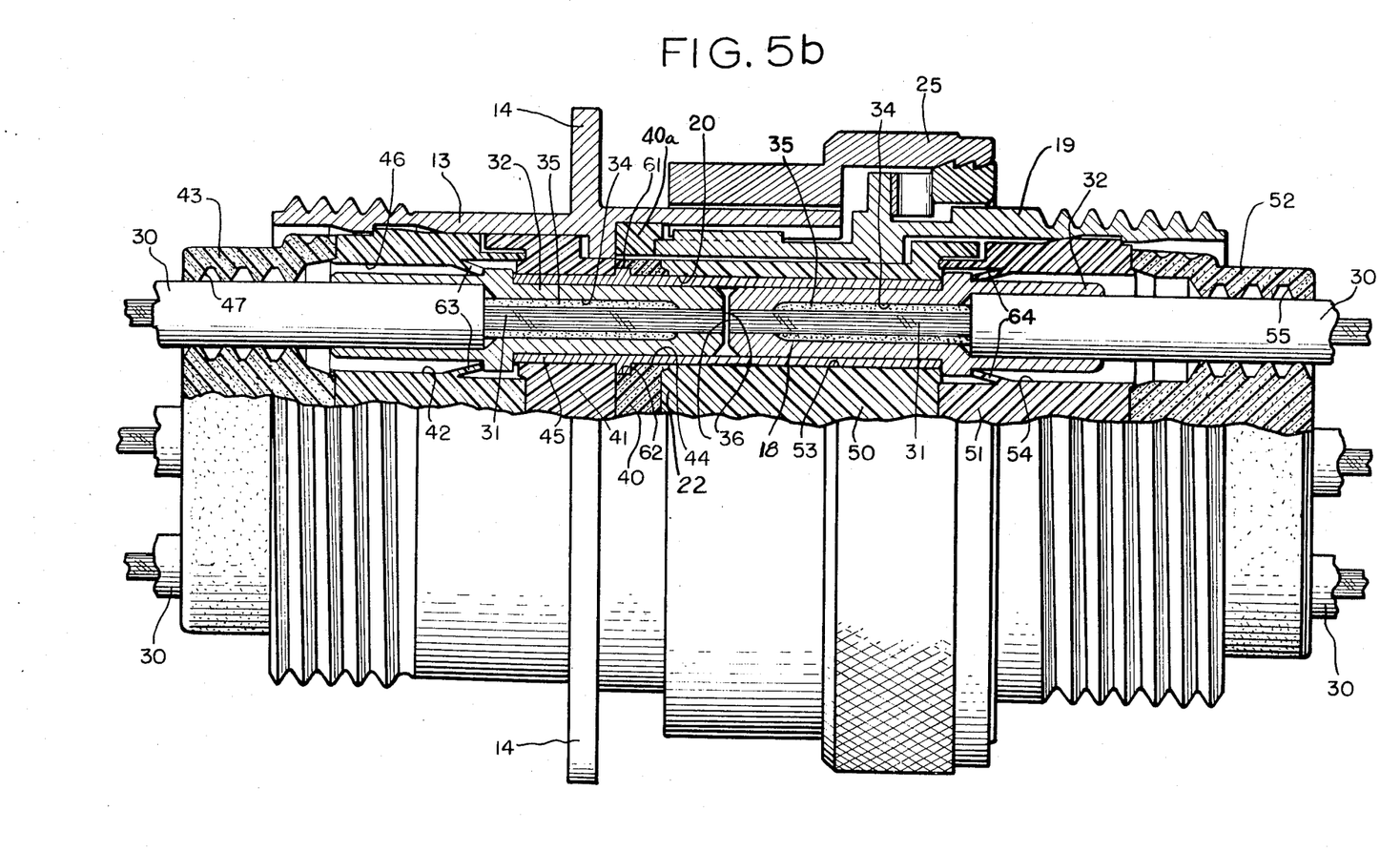
FIG. 5b is an enlarged side elevational view, partially in cross-section, of the connector in a mated condition.
Figure 8:
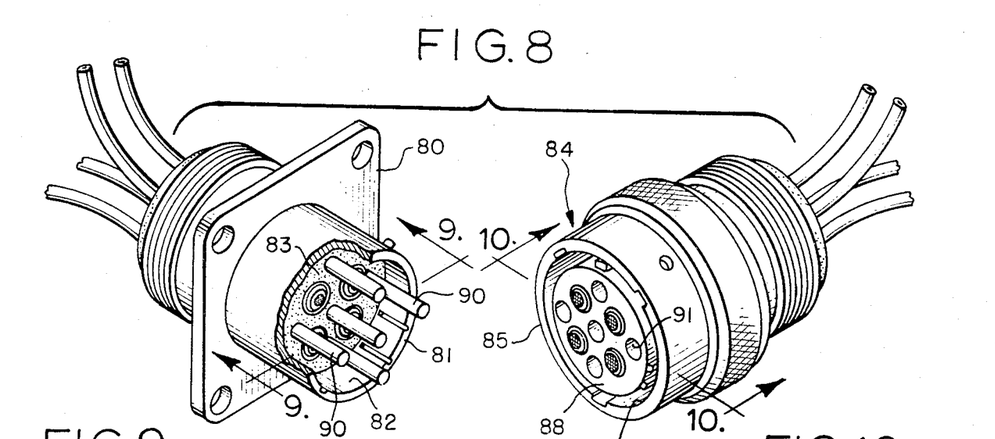
FIG. 8 is a perspective view of an alternate embodiment of a connector which may incorporate the assembly of the present invention.

Referring to FIGS. 4, 5a and 5b, fiber optic cables 15 and 21 may be entirely conventional in design and construction, having an outer jacket 30 and an inner light-conducting core of a single fiber or plural fibers generally designated 31. The fiber core can be constructed either of glass or a suitable plastic material, such as that marketed under the trade name Crofon by the DuPont Company. In the latter instance each fiber in the core 31 may consist of a central strand of polymethyl methacrylate sheathed with a transparent polymer of lower refractive index. The outer jacket 30 can be formed from a polyethylene resin such as that marketed under the trade name Alathon by the DuPont Company.

Referring to FIG. 4, the ends of each of the light-conductive cable segments 15 and 21 are individually terminated by means of terminating pins 32. Each of these pins comprises a hollow generally cylindrical metal housing 33 having an axially extending bore 34 within which the fiber core 31 of the cable is disposed. A layer of adhesive such as epoxy 35 between the fiber core and the wall of the aperture holds the fiber core firmly in place.

The end of the fiber core extends along the bore 34 of the terminating pin and is cut substantially flush with the open end of the termination to provide a flat optical coupling surface 36.

The housing 33 of terminating pin 32 includes a front portion of reduced diameter, and a rear portion of increased diameter, and an annular flange 37 between these two portions. Bore 34 has a corresponding front portion of reduced diameter and a corresponding rear portion of increased diameter joined by a transition of convenient angle or taper, the jacket 30 of the fiber optic cable abutting the tapered shoulder formed between these two portions.

Referring to FIGS. 5a and 5b, the insert assembly 17 within receptacle shell 13 is seen to consist of a disc-shaped face sealing member 40, a peripheral seal 40a, a cylindrical pin insert member 41, pin retention disc 42, and a rear grommet 43, which are preferably constructed of high temperature elastomeric materials such as, for example, plastic and rubber. The face sealing member 40 includes four apertures 44 which are aligned with four apertures 45 in insert member 41, and with four apertures 46 in retention disc 42, and with four ribbed apertures 47 in grommet 43, to provide four continuous axially-extending borelike passageways for receiving the terminal pins associated with respective ones of the four light-conducting cable segments 15.

The insert assembly 22 within the shell 19 of plug 12 is seen to include a cylindrical insert member 50, a retention disc 51, and a grommet 52 (FIG. 5b). The insert member 50 includes an aperture 53 which is aligned with an aperture 54 in retention disc 51, and with an aperture 55 in grommet 52 to form a continuous axially-extending passageway for receiving the terminal pins associated with respective ones of the four light-conducting cable segments 21.

In accordance with the invention, accurate alignment between the terminal pins associated with respective fiber optic cables 15 and the terminal pins associated with corresponding ones of fiber optic cables 21 is maintained by means of sleeve 18 positioned within the passageways formed in insert assembly 17. The alignment sleeves, which may be formed from metal or similar rigid material, are snugly received within these apertures.

The sleeves are resiliently held in place during insertion or removal of plug 12 by means of annular flanges 61 on the outside surfaces of the sleeves. Referring specifically to FIG. 5a, the sleeve is allowed some resilient axial movement upon mating by virtue of the flange 61 being captured in recess 62 formed in the elastomeric material of face seal member 40. Thus, when terminal cable ends are brought together, tines 63 push against the rear of ring 37, the front of ring 37 bears tightly against the end of the sleeve, and the sleeve axially moves within recess 45 achieving equilibrium between similar forces associated with the other half of the mated connector pair.

The slight axial movement permits optimal alignment of both terminating ends on a per channel basis, always maintaining the proper axial separation between faces 36. This movement also allows tines 63 to be freely separated from ring 37 in the unmated condition, permitting unhindered removal of the terminating pin 32 with the tool 70 of FIG. 6.

The terminal pin 32 installed on the end of each of the four fiber optic cables 15 is inserted into its respective sleeve 18 from the rear, the annular flange 37 thereon abutting the rear edge of the sleeve. The inside dimensions of sleeve 18 are such that the terminating pin assembly 32 is snugly received therein and maintained in accurate alignment with respect thereto. A pair of tines 63 projecting inwardly from the wall of aperture 46 bear against the rearwardly-facing surface of the annular flange 37 to lock the terminating pin 32 in position and foreclose axial movement thereof.

In plug 12 the terminating pin 32 of each fiber optic cable 21 is received in respective apertures 53 and 54 and locked in place by means of tines 64 which project inwardly from the walls of recess 54 against the rearwardly facing surface of the terminating pin annular flange 37. The front of the annular flange 37 bears against a shoulder formed on the rear surface of insert member 50, thereby preventing the termination pin assembly 32 from being pulled out during mating or unmating of the connector. Since no alignment sleeve is present in plug 12 the terminal pin assemblies 32 associated with fiber optic cables 21 are not rigidly held in place, but rather are free to move axially and laterally to a limited extent.

When receptacle 11 and plug 12 are mated, as shown in FIG. 5b, insert assembly 22 telescopes into recess 16 as the shell 19 of plug 12 telescopes into the end of receptacle shell 13. This causes the four alignment sleeves 18 associated with receptacle 11 to extend into respective ones of the apertures 53 of insert assembly 22, in which the termination pin assemblies 32 associated with fiber optic cables 21 are disposed. As a result, the reduced diameter portions of the terminal pins associated with cables 21 are received in respective ones of sleeves 60. The resilient mounting of the termination pins 32 in shell 19 facilitates this by enabling the pins to readily align themselves with the approaching sleeves. As the plug and receptacle become fully mated, the end faces 36 of the two terminal pin assemblies come into close, parallel, but non-abutting relationship, for high efficiency light transfer. Since the alignment sleeves 18 determine the positions of the termination pins, misalignment of the coacting light transfer surfaces 36 is precluded.

In addition, when the connector is fully assembled as shown in FIG. 5b, the grommets 43 and 52, the face seal 40, and the peripheral seal 40a are placed in a state of compression. As a result, the connector is completely sealed from impurities or contaminants that might be encountered in the environments where the connector is to be used.

The fiber optic terminal pin assemblies 32 associated with each fiber optic cable are removable from their respective passageways by inserting a small sleeve-shaped tool 70 into the passageways from the rear. This tool, as shown in FIG. 6, serves in the case of receptacle 11 to compress tines 63 against the sidewalls of aperture 46, or, in the case of plug 12 to compress tines 64 against the sidewall of aperture 54, with the result that the pin assemblies are released and can be removed rearwardly from the connector members. This is a significant advantage since it enables individual terminal pin assemblies to be removed, as when correcting installation errors or replacing damaged connectors or components thereof.

An alternate arrangement for maintaining alignment between terminal pins in a shell-type connector is shown in FIGS. 8-11. In this embodiment a receptacle 80 is provided having an elongated shell 81 defining a recess 82 within which an insert assembly 83 is disposed having four flush-mounted fiber optic termination pin assemblies 32. The receptacle 80 is adapted to mate with a plug 84 having an elongated shell 85 defining a recess 86 within which four additional termination pin assemblies 32 are flush mounted. The shell 85 of plug 84 is dimensioned to extend in telescoping relationship over the plug-receiving portion of shell 81. Insert assemblies 87 and 88 similar to those provided in receptalce 11 and plug 12 are provided within receptacle 80 and plug 84 for holding the fiber optic termination pin assemblies in position.

Figures 9, 10, 11:
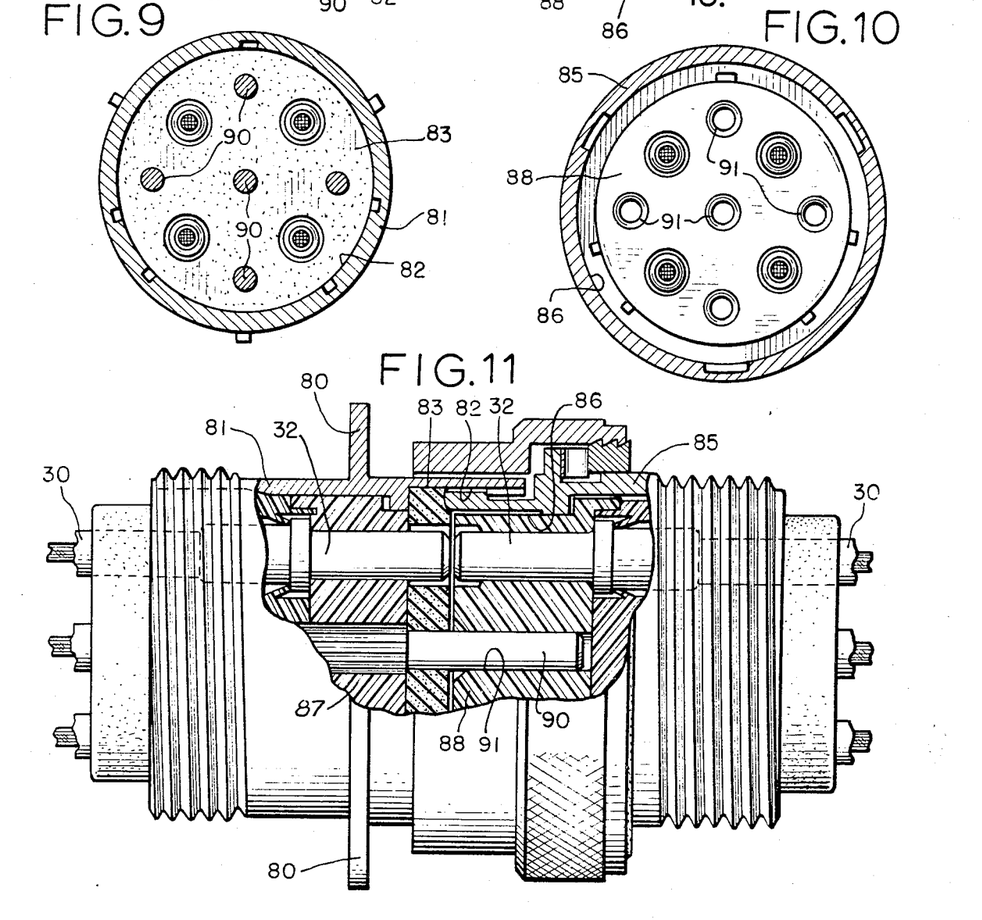
FIG. 9 is a cross-sectional view of the receptacle portion of the connector taken along line 9—9 of FIG. 8.
FIG. 10 is a cross-sectional view of the plug portion of the connector taken along line 10—10 of FIG. 8.
FIG. 11 is a side elevational view, partially broken away, of the connector of FIG. 8 in a mated state.

Since the terminating pin assemblies 32 are positioned with their coupling surfaces 36 parallel to the exposed surfaces of the insert assemblies, the coupling surfaces of corresponding terminal pins are brought into close abutting relationship when the connector is mated, as shown in FIG. 11. To maintain the accurate alignment required between coupling surfaces 36 for good efficiency, the insert assembly 87 of the receptacle 80 includes five axially-extending alignment pins 90 which extend into respective ones of five alignment sockets 91 provided in the surface of the insert assembly 88 of plug 84. By dimensioning these elements for a snug but non-binding engagement, the surfaces of the two insert assemblies are maintained in accurate alignment at all times during their engagement, irrespective of movement of either insert with respect to its shell.

Figure 12:
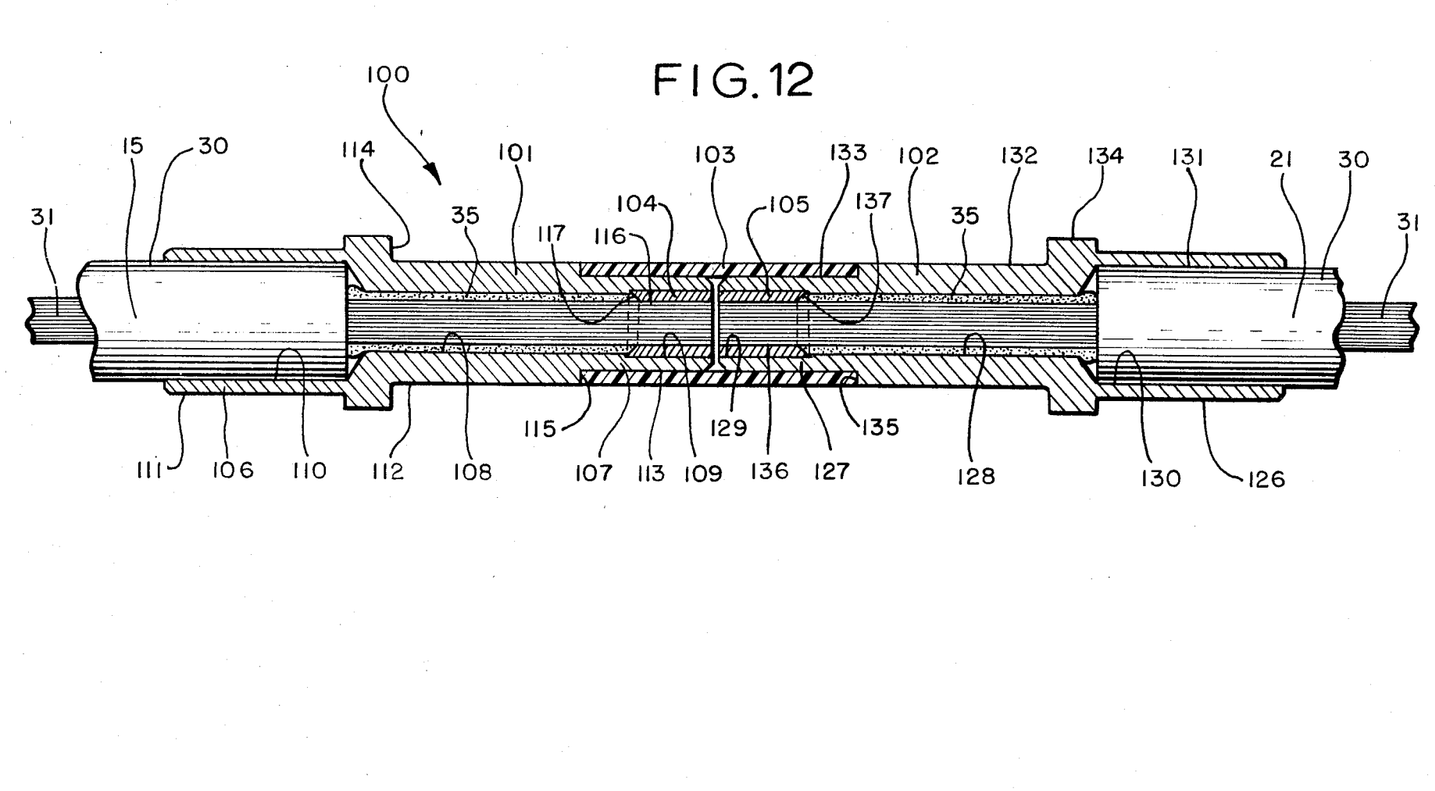
FIG. 12 is a cross-sectional view of a terminal assembly embodying the present invention.

Referring now to FIG. 12, the terminal pin assembly 100 there shown which embodies the present invention includes a first terminal pin 101, a second terminal pin 102, a resilient sleeve means in the form of a tubular member 103, a first tubular insert 104, and a second tubular insert 105. The assembly of FIG. 12 is shown joining fiber optic cables 15 and 21. As previously explained, the cables 15 and 21 include an outer jacket 30 and an inner fiber core 31 which may comprise a single optical fiber or plural optical fibers.

The first terminal pin 101 comprises a tubular housing which includes a rear portion 106 and a forward portion 107. A longitudinal bore 108 extends through the first terminal pin 101 between a counter bore 109 within the forward portion 107 and a second counter bore 110 within the rear portion 106. Longitudinal bore 108 is dimensioned for receiving the fiber core 31 and counter bore 110 is of greater dimension for receiving the outer jacket 30 of cable 15.

The terminal pin 101 also includes a first major diameter portion 111, and second major diameter portion 112 which is smaller in diameter than portion 111, and a minor diameter portion 113. An annular flange 114 is provided between the first major diameter portion 111 and the second major diameter portion 112 and cooperates with tines as previously described in mounting the pin 101 within one of the connectors of FIG. 5 or 11.

The second major diameter portion 112 and the minor diameter portion 113 form an external shoulder 115. The shoulder 115 performs a function which will be described subsequently.

The insert member 104 is shown within counter bore 109 and includes a channel 116 which is concentric with the outer diameter of the insert member 104. The counter bore 109 is concentric with the outer diameter of the minor diameter portion 113 of forward portion 107. As a result, channel 116 is concentric with the outer diameter of the forward portion 107. With this construction, a fiber core received by channel 116 will in turn be concentrically aligned with the outer diameter of forward portion 107.

The second terminal pin 102 is identical to terminal pin 101 and therefore it need not be described in detail. Suffice it to say that it also includes a rear portion 126, and forward portion 127, a longitudinal bore 128, a counter bore 129 and a second counter bore 130. Pin 102 also has a first major diameter portion 131, a second major diameter portion 132, and a minor diameter portion 133. Pin 102 also includes an annular flange 134.

The second major diameter portion 132 and the minor diameter portion 133 form an external shoulder 135. Within counter bore 129 is the second insert member 105 which includes concentric channel 136.

The channels 116 and 136 are smaller in diameter than longitudinal bores 108 and 128 respectively and are joined by respective tapering inner sidewalls 117 and 137 which guide the fiber cores through the longitudinal bores into the channels.

Tubular member 103 is preferably constructed out of Teflon and has an inner diameter equal to or slightly less than the outer diameters of forward portions 107 and 127. By being so constructed, the resilient tubing 103 is tightly received by the forward portions 107 and 127. Because channels 116 and 136 are concentric with the outer diameters of the forward portions 107 and 127, the resilient sleeve will align the end faces 36 of cables 15 and 21 in facing relation.

The length of tubing 103 is such that with the tubing abutting the shoulders 115 and 135, a predetermined close spacing of end faces 36 will be effected. As a result, with the end faces aligned in facing relation and closely spaced, efficient light transfer between the fiber optic cables 15 and 21 will be provided.

The foregoing structure has been found to be extremely advantageous from the standpoint of manufacturing tolerance. With present day technology, it is much easier to hold tight concentricity tolerance levels to the forward portions 107 and 127, bores 109 and 129, inserts 104 and 105, and the channels 116 and 136, than to fabricate each terminal pin as one piece. As a result, the present invention provides a connector assembly which is less costly to fabricate and which affords improved alignment of the fiber optic cables.

Also, the location of the shoulders 115 and 135 and length of tubing 103 can be tightly controlled. As a result, the end faces 36 may be spaced very closely without touching. All of the foregoing results in a less costly connector assembly which affords improved performance. The fiber cores 31 of cables 15 and 21 are secured within the pin terminals 101 and 102 by epoxy 35 or other suitable adhesive material.

As a specific example for illustrative purposes, and not by way of limitation, the various component parts may be nominally dimensioned as follows for interconnecting the terminal ends of single fiber cables manufactured by International Telephone and Telegraph Corporation designaged as "S1" single fiber cable.

length of minor diameter portions 113 and 133: 0.125 inch outer diameter of portions 113 and 133: 0.085 inch length of insert members 104 and 105: 0.062 inch outer diameter of insert members 104 and 105: 0.047 inch diameter of insert channels 116 and 136: 0.010 inch angle of tapered walls 117 and 137: 60° included diameter of longitudinal bores 108 and 128: 0.033 inch diameter of counter bores 110 and 130: 0.070 inch length of sleeve 103: 0.252 inch From the foregoing illustrative dimensions, it can be seen that with the length of each of the minor diameter portions 113 and 133 being 0.125 inch, and with the length of sleeve 103 being 0.252 inch, when sleeve 103 is tightly fitted over the minor diamter portions 113 and 133 and abutted against external shoulders 115 and 135, a predetermined spacing of 0.002 inch results between end faces 36. It has been found that a 0.002 inch spacing between end faces 36 results in efficient light transfer between the cables 15 and 21.

It will be appreciated that while the invention has been shown in conjunction with connectors having round shells and four interconnections, it is also possible to practice the invention in connection with a greater or lesser number of interconnections, and with shells having other shapes and sizes, including rectangular and square cross-sections.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. An assembly for aligning and spacing the terminal ends of a pair of fiber optic cables to achieve efficient light transfer between the cables comprising:

a first terminal pin having an opening extending therethrough for receiving the terminal end of one of the cables and having stop means associated therewith;

insert means dimensioned for insertion into said first terminal pin and having a channel communicating with said opening for receiving and aligning the terminal end of said one of the cables in a centered position relative to the outer surface of said first terminal pin;

a second terminal pin having an opening extending therethrough for receiving the terminal end of the other of the cables and having stop means associated therewith;

insert means dimensioned for insertion into said second terminal pin and having a channel communicating with said opening for receiving and aligning the terminal end of said other of the cables in a centered position relative to the outer surface of said second terminal pin; and resilient sleeve means having an opening extending therethrough tightly conforming to the size and shape of the outer surface of said first and second terminal pins, said sleeve means receiving said first and second terminal pins in telescoping fashion for aligning said terminal ends in facing relation, said sleeve means cooperating with said stop means to effect a predetermined close spacing of said terminal ends in centered relation, whereby said assembly provides an efficient light transfer between said pair of fiber optic cables.

2. The assembly as defined in claim 1 wherein said first and second terminal pins each comprise a tubular housing, said openings extending through said terminal pins comprise bores, and said resilient sleeve means comprises a resilient tubular member having an inner diameter which is equal to or slightly less than the outer diameter of said tubular housings.

3. The assembly as defined in claim 2 wherein each of said tubular housings includes a major diameter portion and a minor diameter portion, and each of said stop means comprises an external shoulder portion joining said major diameter portion and said minor diameter portion of one of said tubular housings.

4. The assembly as defined in claim 3 wherein each of said tubular housings includes a rear portion and a forward portion, a longitudinal bore dimensioned for receiving the terminal end of one of the cables, and a counter bore in said forward portion concentric with the outer dimension of said tubular housing and greater in dimension than said longitudinal bore, and each of said insert means is a tubular member dimensioned for insertion into one of said counter bores and said channel of said insert means is concentric with said longitudinal bore and communicates with said longitudinal bore to receive the terminal end of one of the cables for alignment substantially concentric to the outer dimension of said tubular housing.

5. The assembly as defined in claim 4 wherein said concentric channel of each of said tubular insert members is smaller in dimension than said longitudinal bore in the corresponding one of said tubular hosuings and each of said tubular insert members further includes an inner tapering side wall portion joining the corresponding ones of said longitudinal bores and said concentric channels.

6. The assembly as defined in claim 5 wherein each of said fiber optic cables includes an outer jacket and an inner fiber optic core, each of said tubular housings includes a second counter bore in said rear portion thereof dimensioned for receiving said outer jacket of one of said fiber optic cables, and each of said longitudinal bores and said channels are dimensioned for receiving said fiber optic core of one of said fiber optic cables.

7. The assembly as defined in claim 6 wherein said sleeve means is formed from Teflon.

8. An assembly for aligning the terminal ends of first and second segments of light conductive cable and maintaining the spacing between the terminal ends for efficient light transfer comprising:

a. first terminal pin having a forward portion and having an opening extending therethrough for receiving the terminal end of one of said cable segments, said first terminal pin having stop means associated therewith rearwardly of said forward portion;

means associated with said forward portion of said first terminal pin for receiving and aligning the terminal end of said one of said cable segments in a centered position relative to the outer surface of said first terminal pin;

a second terminal pin having a forward portion and having an opening extending therethrough for receiving the terminal end of the other of said cable segments, said second terminal pin having stop means associated therewith rearwardly of said forward portion;

means associated with said forward portion of said second terminal pin for receiving and aligning the terminal end of said other of said cable segments in a centered position relative to the outer surface of said second terminal pin; and resilient sleeve means having an opening extending therethrough tightly conforming to the size and shape of the outer surface of said forward portions of said first and second terminal pins, said sleeve means receiving said forward portions of said first and second terminal pins in telescoping fashion for aligning the terminal ends of said cable segments in facing relation, said sleeve means cooperating with said stop means to maintain a close predetermined spacing of said terminal ends in centered relation, whereby said assembly provides an efficient light transfer between said first and second cable segments.

9. The assembly as defined in claim 8 wherein the opening in each of said terminal pins includes a longitudinal bore extending therethrough and a counter bore in said forward portion concentric with the outer diameter of said forward portion, said counter bore being greater in diameter than said longitudinal bore, and each of said receiving and aligning means includes a tubular insert member disposed within said counter bore having a channel concentric with the outer diameter of said insert member, said channel being in communication with said longitudinal bore for receiving the terminal end of one of said cable segments to align said cable substantially concentric to the outer diameter of said forward portion of one of said terminal pins.

* * * * *